US005748077A

United States Patent [19]
Brandt

[11] Patent Number: 5,748,077
[45] Date of Patent: May 5, 1998

[54] HYDRAULIC LEAK DETECTION SYSTEM

[75] Inventor: Calvin Brandt, Elk River, Minn.

[73] Assignee: McNeilus Truck and Manufacturing, Inc., Dodge Center, Minn.

[21] Appl. No.: 779,377

[22] Filed: Jan. 7, 1997

Related U.S. Application Data

[63] Continuation of Ser. No. 242,176, May 13, 1994, abandoned.

[51] Int. Cl.$^6$ .................................................. B60Q 1/00
[52] U.S. Cl. .................. 340/450; 340/450.1; 340/451; 340/605; 340/592; 73/199
[58] Field of Search .......................... 340/450, 450.1, 340/451, 452, 592, 603, 605, 606, 611, 612, 626; 73/199

[56] References Cited

U.S. PATENT DOCUMENTS

| | | | |
|---|---|---|---|
| 4,125,163 | 11/1978 | Fitzpatrick | 166/314 |
| 4,471,797 | 9/1984 | Cass et al. | 137/100 |
| 4,522,109 | 6/1985 | Marchi et al. | 91/420 |
| 4,549,429 | 10/1985 | Kurt | 73/40 |
| 4,864,547 | 9/1989 | Anderson et al. | 73/40.7 |
| 5,046,313 | 9/1991 | Crumb et al. | 340/450.1 |
| 5,221,125 | 6/1993 | Okochi et al. | 303/10 |
| 5,272,646 | 12/1993 | Farmer | 364/509 |

*Primary Examiner*—Jeffery Hofsass
*Assistant Examiner*—Daryl C. Pope
*Attorney, Agent, or Firm*—Haugen and Nikolai, P.A.

[57] ABSTRACT

A system for detecting leaks in a hydraulic system. The system shuts down the hydraulic system if a leak is detected and notifies individuals in the area that a leak has occurred. The leak detection system has sensors for measuring hydraulic system parameters and a computer for detecting abnormalities in the system based on values returned by the sensors. Sensors used in the example leak detection system include an RPM pickup, a pressure transducer, a flow meter and an hydraulic fluid level and temperature switch. Outputs of the sensors are analyzed by the computer to determine if the hydraulic system has a leak. If a leak is detected, the computer sends response signals to a device for engaging or disengaging the prime mover from the hydraulic pump and to another device for actuating a valve to stop hydraulic fluid flow from the reservoir. The computer may also send indicator signals to a display console for activating a warning light, a buzzer or a display.

14 Claims, 4 Drawing Sheets

HYDRAULIC LEAK DETECTION SYSTEM

This is a continuation of application Ser. No. 08/242,176, filed on May 13, 1994 now abandoned.

BACKGROUND OF THE INVENTION

I. Field of the Invention

This invention relates generally to warning and safety systems and more particularly, to a system for detecting and indicating a fluid leak in an hydraulic system, and thereafter shutting down the hydraulic system. The invention has application to portable and stationary systems.

II. Discussion of the Prior Art

Hydraulic systems include a dual purpose fluid which is typically a hydrocarbon, synthetic, water, mineral or vegetable based material. The fluid serves to transmit the forces necessary to operate hydraulic devices, such as those used for moving and lifting various machinery parts and objects. It also lubricates and prevents corrosion of components in the hydraulic system, such as pumps, valves and cylinders.

Unfortunately, hydraulic fluids typically do not break down naturally, and escape of such materials into the environment is ecologically undesirable. If a leak goes undetected, the result may be damage to the environment, possible or potential physical injury to individuals and mechanical damage to the hydraulic system. A hose break or a major cylinder seal failure in a system component may lead to a sudden catastrophic loss of hydraulic fluid. This is especially true if the hydraulic pump continues to pump fluid into the system after the leak has occurred. In this instance, essentially all of the hydraulic fluid may be pumped out of the system and into the environment before the problem is detected. Moreover, since hydraulic systems are often used for moving or lifting large and heavy objects, a major loss of fluid may cause the hydraulic machinery to drop or dislodge a heavy object. A person who is unaware of the hydraulic fluid leak and who is working on or near the machine, may be injured by the falling object and moving machinery parts. Also, if the hydraulic system components continue to operate after most of the fluid is pumped out of the system, the components may suffer irreparable damage through lack of lubrication. Thus, a relatively small and inexpensive hose or seal repair could develop into a major hydraulic system failure leading to personal injury and mechanical damage, not to mention the damage to the environment through leakage of the fluid onto the ground.

U.S. Pat. No. 4,471,797, issued to Cass et al. discloses a hydraulic circuit breaker device for stopping the flow of fluid in the event the flow to an actuator system is greater than the flow returning from the actuator system by more than a predetermined differential. The circuit breaker device resets itself if the pressure in the actuator system increases after shut-off thereby indicating the absence of a leak. This device looks for one predetermined flow differential. In a hydraulic system performing a number of different functions there may be a number of different fluid flow differentials to watch for. Thus, a more comprehensive leak detection system is needed. Also, the circuit breaker device does not shut down other hydraulic system components and damage may result.

To prevent injuries to people and mechanical damage to the hydraulic system and to prevent damage to the environment, the leak detection system of the present invention senses and detects the presence of abnormalities in a variety of hydraulic system operating characteristics. The abnormalities detected indicate a leak has occurred in the hydraulic system. Once a leak is detected, the leak detection system shuts down the hydraulic system and indicates the condition to the operator.

One way to shut down a hydraulic system is to disengage the hydraulic pump from the prime mover or engine driving it, and stop the hydraulic fluid flow by closing a valve in the input or inlet line leading to the hydraulic pump from the reservoir. This prevents the pump from pumping essentially all of the hydraulic fluid out of the system and onto the ground.

It is accordingly a principal object of the invention to provide a warning and safety system for a hydraulic system to protect the environment and associated machinery.

Another object of the invention is to provide a leak detection system for detecting leaks in a hydraulic system.

Yet another object of the invention is to provide a hydraulic leak detection system that responsively or reactively shuts down the system.

Yet another object of the invention is to provide a hydraulic leak detection system for sensing and detecting leaks in a mobile hydraulic system, shutting down the hydraulic system and notifying individuals in the area that a leak has occurred.

Yet another object of the invention is to provide a hydraulic leak detection system for sensing and detecting a leak in a stationary hydraulic system, shutting down the hydraulic system and notifying individuals in the area that a leak has occurred.

Other objects, features and advantages of the present invention will become apparent to those skilled in the art through familiarity with the summary of the invention, detailed description, claims, and drawings herein.

SUMMARY OF THE INVENTION

The foregoing features and advantages of the present invention are attained by providing a leak detection system including a micro-controller based computer in communication with sensors situated in the hydraulic system. The computer receives signals from the sensors and uses them either directly or by comparing them against preset values held in computer memory to determine if an abnormal condition exists. The computer will respond to an abnormal condition by generating signals for shutting down the hydraulic system and indicating that a leak has occurred. One embodiment of the leak detection system has been built for a truck mounted hydraulic system. Of course, the leak detection system could be adapted for use on any machine having an hydraulic system with the same basic elements.

The hydraulic system may be any ordinary open or closed loop hydraulic system and typically it has a driven hydraulic pump whose output is connected to hydraulic system operating components. In an open loop system, a return line is provided for circulating fluid back to the reservoir from the operating components. In a closed loop system fluid is circulated about a closed system and make-up hydraulic fluid is added as needed from a supply.

The invention is directed to a system for detecting major leaks or catastrophic failures in the hydraulic system and shutting down the hydraulic system if such is detected. In respect to slower leaks, if, for example, over time a drip reduces the hydraulic fluid level to an unsafe or undesirable level, the system of the invention will also shut down the hydraulic system and notify the operator.

The preferred leak detection system is described by way of example with reference to a refuse truck and has five sensors situated in the hydraulic system and electrically connected to the computer. Values obtained by the sensors for hydraulic system parameters are transmitted to the computer for evaluation. The computer uses the received values directly or compares the received values to stored values to determine if the hydraulic system has a leak. If a measured value violates a corresponding operating window or preset value, the computer generates response and indicator or display signals for shutting down the hydraulic system and indicating the abnormal condition to individuals in the area.

The sensors used in the refuse truck leak detection system include a pressure transducer situated in a hydraulic line. Hydraulic pump operation is monitored by an RPM meter and a return line flow meter that measures the flow of hydraulic fluid through the system. From signals sent by these sensors, an hydraulic fluid flow ratio is determined for analysis.

Other sensors include, an hydraulic fluid float and temperature switch situated in the reservoir. If a minimum level of fluid is not maintained in the reservoir for a predetermined period of time, e.g. approximately three seconds, the hydraulic system is shut down. Also, if a minimum fluid temperature is not achieved, e.g. 65° F. or 18° C., the leak detection system will not monitor the hydraulic system.

The leak detection system of the present invention has two modes of operation. These are the Calibrate/Clear/Maintenance Mode and the Operate Mode. The Calibrate/Clear/Maintenance Mode is for entering set-up values into the computer and, also, clearing or resetting the leak detection system after a leak has been detected. The Operate Mode checks measured parameters against set-up values to determine if a leak has occurred. The leak detection system will monitor the hydraulic system for leaks only after certain pre-monitoring conditions are met. Once these conditions are met, the leak detection system checks fault conditions to determine if the hydraulic system is performing normally. An abnormal condition may be due to a leak in the hydraulic system or another problem, such as a blown fuse. The fault conditions monitored in the present leak detection system embodiment are representative of the type checked. Of course, the number and type of fault conditions checked by a particular leak detection system may vary from one hydraulic system to another.

In general, fault conditions monitored in the preferred embodiment include predetermined combinations of hydraulic system parameters and flow ratios. The set-up values are compared to real time operating parameter values as sensed by the sensors. If the values measured by the sensors violate the fault condition set-up values or flow ratios, the hydraulic system is shut down and warnings are communicated to the operator.

Other fault conditions, in the preferred embodiment, monitor one input only. For example, fluid pressure is monitored to make sure the hydraulic system does not operate with low fluid pressure for longer than a predetermined time. Fluid level is monitored to make sure it is adequate and the power fuse is monitored to make sure the leak detection system is receiving power. If any of these conditions are violated, the hydraulic system is shut down and the operator is notified. Also, an over temperature hydraulic fluid condition may be monitored and indicated to the operator.

Shut down of the hydraulic system and communication of the reason for it is initiated by the computer. The computer will generate response signals for shutting down the hydraulic system and indicator signals for communicating to the operator that shut down has occurred and the reason for it.

One response signal for shut down is sent to a device, which may be a clutch, for disengaging the hydraulic pump from the prime mover driving it. A second response signal is sent to close a valve in the inlet line to the pump and stop fluid flow from leaving the reservoir. In the preferred embodiment, the inlet shut-off valve could be an electrically controlled, pneumatically operated valve. As an example, electrically operated solenoids connect an air supply hose with a pneumatic actuator. The actuator is connected to a normally open (NO) ball valve situated in the inlet line leading from the hydraulic fluid reservoir to the hydraulic pump. Pressurized air is supplied by an air supply and the actuator closes the ball valve to cut off fluid flow to the hydraulic pump.

The leak detection system is provided with a display console which may include a leak detection light, an audible alarm or leak detection buzzer and a display. If the computer determines that an abnormal condition is present, the computer will shut down the hydraulic system and send indicator signals to the display console. Typically, when a leak occurs, the leak detection warning light and alarm buzzer are activated, and the reason for the shut down is displayed on the display.

DETAILED DESCRIPTION

Figure 1:
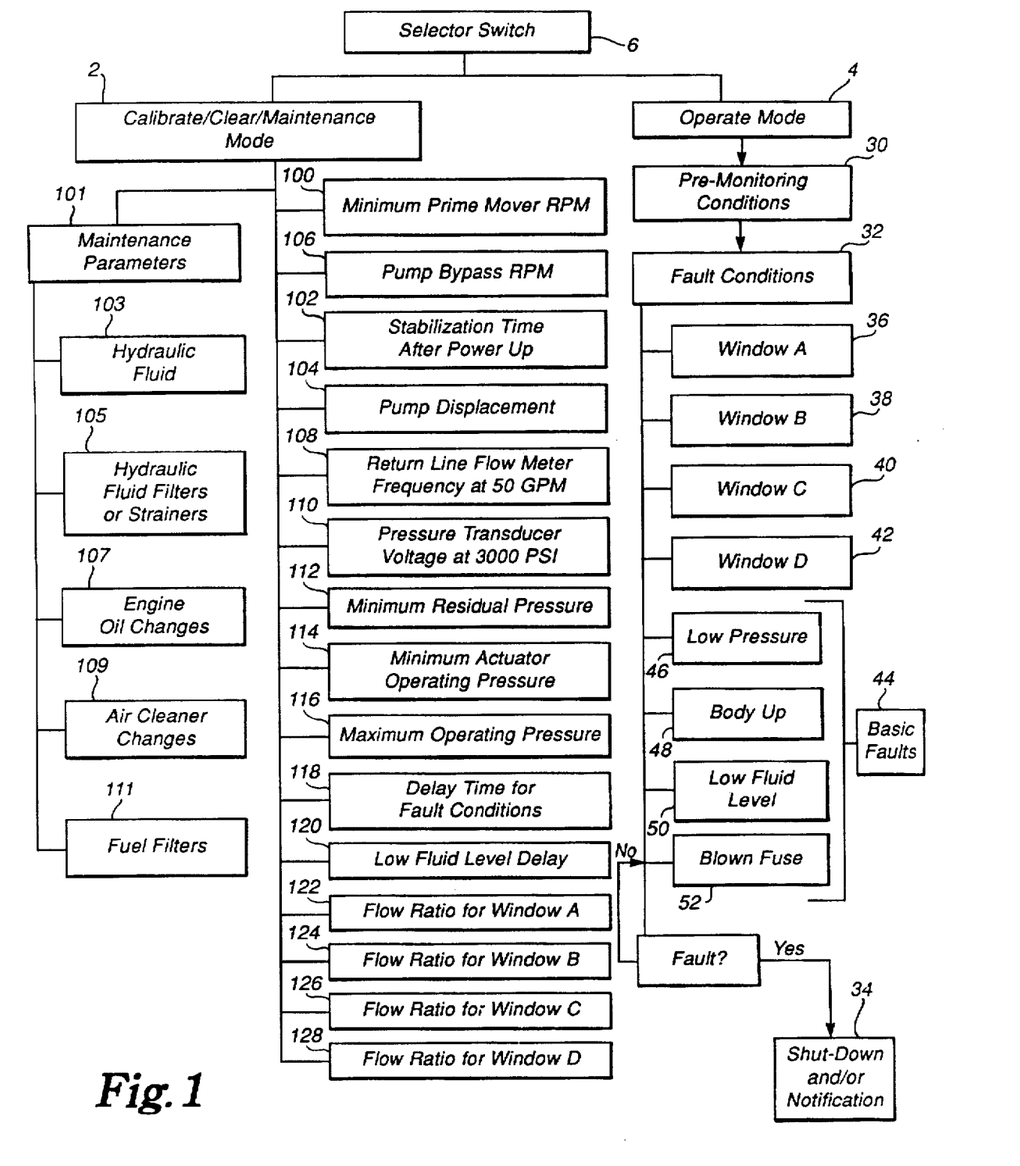
FIG. 1 is a flow chart of the two modes of operation for a leak detection system in accordance with the invention.

As diagrammed in FIG. 1, the leak detection system of the preferred embodiment has two modes of operation. These are the Calibrate/Clear/Maintenance Mode 2 and the Operate Mode 4. The mode is selected by turning a selector switch, indicated throughout by the numeral 6. The selector switch 6 is turned to the Calibrate/Clear/Maintenance Mode 2 for inputting the leak detection system set-up values and calibrating the parameters as needed over time. The Calibrate/Clear/Maintenance Mode 2 is also used to clear or reset the system after a leak has been detected. In the Operate Mode 4, the leak detection system monitors the hydraulic system's operating characteristics for undesirable or abnormal conditions.

Figure 2:
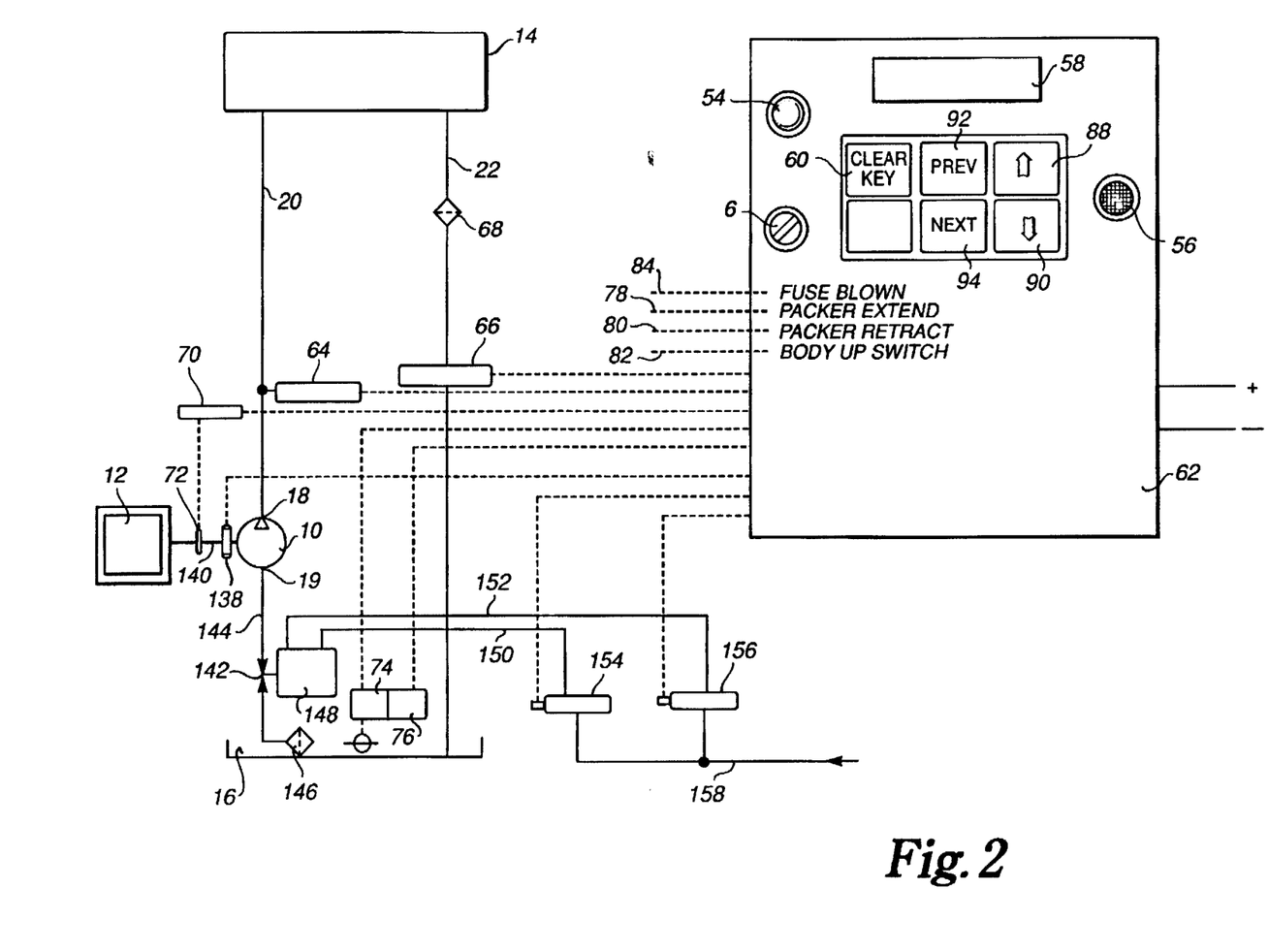
FIG. 2 is a schematic block diagram of the leak detection system of FIG. 1 connected to an hydraulic system.

FIG. 2 is a schematic block diagram of the leak detection system connected to an hydraulic system. The leak detection system is built to detect undesirable conditions in any ordinary hydraulic system comprising an hydraulic pump 10 driven by a prime mover 12 and connected to the hydraulic system's operating components, indicated by the numeral 14. The input or inlet of the hydraulic pump 10 draws hydraulic fluid from an hydraulic fluid reservoir 16. The hydraulic pump output 18 is connected to a high pressure line 20 which is in turn connected to the hydraulic system's operating components 14. A return line 22 is connected to the non-pressurized side of the operating components 14 and leads back to the hydraulic fluid reservoir 16.

This example of a hydraulic system involves a open loop system wherein the hydraulic pump 10, driven by the prime mover 12, pumps the hydraulic fluid through the hydraulic system. This example of the leak detection system of the embodiment described herein in detail illustrates a hydraulic system operating compacting and ejecting functions on a refuse truck. However, the leak detection system can be used on an hydraulic system associated with any machine.

As shown in FIG. 1, the leak detection system of the preferred embodiment performs three functions in the Operate Mode 4. These three functions are: checking the pre-monitoring conditions 30, monitoring the hydraulic system for fault conditions 32, and shutting down the hydraulic system and communicating the shut-down to the operator or other individuals in the area at 34.

The pre-monitoring conditions 30 are checked by the leak detection system before it begins monitoring the hydraulic system. The leak detection system will not monitor the hydraulic system if a pre-monitoring condition is violated. This establishes that the prime mover 12 is running up to speed for a minimum period of time. An engaging/disengaging device 138, FIG. 2, must be engaged between the prime mover 12 and the pump 10 to pump hydraulic fluid through the system. Also, the hydraulic fluid level and temperature must be adequate for proper operation. Finally, the pre-monitoring condition check verifies that power is being supplied to the leak detection system and displays various operating parameters of the hydraulic system to the operator.

The leak detection system monitors the hydraulic system by checking fault conditions 32. The fault conditions are generally divided into fault windows A–D, 36, 38, 40, and 42, respectively, and basic faults, collectively 44, indicated by the numerals 46, 48, 50, and 52. A fault window is violated if any parameter is not as expected for one state of the hydraulic system. The violation must be present for a predetermined period before the leak detection system shuts down the hydraulic system. The low pressure fault 46, monitors the hydraulic fluid pressure to ensure a minimum pressure is present in the hydraulic system. If a minimum hydraulic fluid pressure is not present for a predetermined period, and a minimum hydraulic fluid temperature is present, the leak detection system shuts down the hydraulic system regardless of the operating state of the hydraulic system. The body up fault 48 checks for a minimum hydraulic fluid pressure when the body of the truck is in the up position. The body of the refuse truck is that portion of the truck containing the compacted refuse. The body is raised to the up position to dump the refuse from the truck after opening the tail or rear gate. A minimum hydraulic fluid pressure must be present to ensure that the dumping operation is done safely. In this state, the leak detection system ignores all of the fault windows A–D, respectively 36, 38, 40, and 42. The low fluid level fault 50 checks the adequacy of the hydraulic fluid level in the reservoir. The blown fuse fault 52 verifies that the fuse leading to the leak detection system is not blown. If any of the fault conditions 32 are violated, the leak detection system will shut down the hydraulic system and notify the operator or individuals in the area.

The leak detection system responds or reacts rapidly to a violated fault condition by shutting off the fluid flow from the reservoir 16 to the hydraulic pump 10 and disengaging the hydraulic pump 10 from the prime mover 12. The leak detection system alerts the operator to the violation by setting off an alarm light 54 and buzzer 56, diagramed in FIG. 2. The cause of the shutdown is displayed on a multi-character display 58.

To reset the leak detection system, the operator turns the selector switch 6 to the Calibrate/Clear/Maintenance Mode 2 and pushes the clear leak button 60. The selector switch 6 is turned back to the Operate Mode 4 to monitor the hydraulic system.

As shown in FIG. 2, the leak detection system includes a micro-controller based computer 62 in communication with five sensors in the hydraulic system. The five sensors produce signals indicative of the value of certain parameters in the hydraulic system. The sensor signals are transmitted to the computer 62 for determining the presence of a fault condition in the hydraulic system and the computer 62 responds accordingly.

The five sensors in the hydraulic system include a pressure transducer 64 situated in the high-pressure line 20 of the hydraulic system leading from the hydraulic pump 10 to the hydraulic system operating components 14. This pressure transducer 64 monitors the pressure in the high-pressure line 20. The pressure transducer 64 provides an analog voltage signal proportional to the pressure of the hydraulic fluid entering the system from the pump. The analog voltage signal typically ranges from 0 to 5 volts DC and is transmitted to the computer 62 for analysis.

A return line flow meter 66 is situated in the return line 22, leading from the hydraulic system operating components 14 back to the hydraulic fluid reservoir 16. The flow meter 66 sends a pulse train signal proportional to fluid flow in the return line 22 to the computer 62. A filter 68 is connected between the hydraulic system operating components 14 and the flow meter 66. The filter 68 filters the hydraulic fluid before it returns to the reservoir 16.

A prime mover RPM meter 70 is connected at the prime mover 12 and is used for monitoring the speed of the prime mover 12. The prime mover RPM magnetic pickup 72 located at the fly wheel of the prime mover 12 provides a pulse train proportional to the prime mover's RPM to the computer 62.

A low level float switch 74 is located in the hydraulic fluid reservoir 16 for monitoring the amount of hydraulic fluid in the reservoir 16. The float switch 74 opens when the hydraulic fluid level is too low. This open condition is transmitted to the computer 62 for analysis. The hydraulic fluid temperature is monitored by a temperature switch 76 connected to the float switch 74. The temperature switch 76 is set to approximately 65° F. or 18° C. Upon closure, the temperature switch sends a 12 volt DC input signal to the computer 62, indicating the hydraulic fluid temperature is adequate.

The computer 62 is programmed to receive and analyze the signals from the five sensors along with other input signals to determine if one of the fault conditions 32 has been violated. Other sensors or switches monitor the state of the hydraulic system. One supplies a packer extend input 78 for receiving an electrical signal coming from the truck and indicating whether the truck's packer is extending. In the refuse truck example, refuse is dumped into the body of the truck for compaction. An hydraulically driven packer is extended to compact the refuse. The packer typically uses a special actuator and it's activity is monitored separately for this particular application. The packer extend signal is present only if the packer on the truck is extending. A second input is the packer retract input 80 for receiving an electrical packer retract signal coming from the truck and indicating that the refuse truck's packer is retracting.

The body up input 82 is a third input for receiving a signal coming from a body up proximity switch indicating that the body is up on the refuse truck. This switch is open when the body is in the up position for dumping refuse. Of course, these three signals are specific to the present leak detection system on the example hydraulic system of the refuse truck. Sensor signals and switch signals needed for characterizing a different hydraulic system will vary depending on the hydraulic system and the application.

A fourth input, is the fuse blown input 84 for receiving a signal coming from the computer's power fuse. A signal is taken away from this input if the fuse is blown. These four inputs together with the five inputs from the other sensors are used by the computer 62 to determine if one of the fault conditions 32 has been violated.

Before the leak detection system can be used to monitor an hydraulic system for failures, various setup parameter values must be put into the computer 62. These setup parameters calibrate the computer 62 to the hydraulic system being monitored and may be changed as the hydraulic system's characteristics change over time. The setup parameters or calibration factors are entered into the computer 62 through the leak detection console 86, shown in FIG. 3. Entry of the setup parameters is typically menu driven.

The computer 62 uses setup parameters or calibration factors in its program for determining whether or not any of the fault conditions 32 have been violated. The setup parameters are diagrammed in FIG. 1 under the Calibrate/Clear/Maintenance Mode 2. The first parameter is the minimum prime mover RPM value, indicated by the numeral 100. The leak detection system will not monitor the hydraulic system for a fault condition violation unless the prime mover 12 is above this RPM value. The default value for this parameter may be, for example, 300 RPM's. This default value can be changed in increments of 10 to a minimum of 200 and a maximum of 650 RPM's.

The hydraulic system needs time to stabilize before the leak detection system begins looking for fault condition violations after the prime mover's RPM value is above the minimum. The stabilization time after power up (at 102) is used for this purpose and defaults to 10 seconds. This may be changed in increments up to a maximum of 30 seconds.

To calculate hydraulic fluid flow ratios, the computer 62 first calculates the theoretical hydraulic pump output flow rate in gallons or liters per minute (GPM or LPM). The output flow rate is then divided by the return flow, as measured by the flow meter 66, to give the flow ratio. The hydraulic pump output flow in GPM/LPM is calculated by multiplying the actual prime mover RPM times pump displacement, and dividing the resulting value by 231 cubic inches per gallon or 1000 cubic centimeters per liter. The pump displacement parameter 104 is a constant value put into computer memory. The default value for the pump displacement parameter 104 is 9.2 cubic inches per revolution (CIR) or 150.76 cubic centimeters per revolution (CCR). This value can be changed in preset increments, such as 0.1, up to a maximum of 15 CIR or 245.8 CCR. However, the pump size is not significant since the system will work with any displacement pump.

The hydraulic pump 10 will bypass flow from the pump outlet 18 back to the pump inlet 19 if the prime mover 12 is going too fast, e.g. faster than 1650 RPM's. This prevents the hydraulic functions from overspeeding. Of course, the theoretical calculation for hydraulic fluid flowing out of the hydraulic pump 10 will not be accurate if the hydraulic pump 10 is bypassing flow, and the computer 62 must detect this condition. The computer 62 does this by comparing the prime mover RPM against the stored hydraulic pump bypass RPM value, indicated by numeral 106. The pump bypass RPM 106 default in this example, may be 1600 RPM and changed in increments of 50 from a minimum of 1000 to a maximum of 2500 RPM's.

The return line flow is determined by the computer 62 after receiving the pulse train signal proportional to fluid flow sent by the return line flow meter 66. In this example, the signal returned from the return line flow meter 66 is a frequency. The computer 62 uses a reference value for correlating the frequency of the return line flow meter 66 to the actual hydraulic fluid flow returning to the hydraulic fluid reservoir 16. The return line flow meter frequency signal at 50 GPM (189.27 LPM), parameter 108, serves this purpose. The default value for this parameter is 200 Hz. This value can be changed in increments of 1 from 50 to 400 Hz.

The pressure exerted by the hydraulic fluid in the hydraulic system is monitored by the pressure transducer 64 situated in the high pressure line 20. The value sent from the pressure transducer 64 to the computer 62 is a DC voltage ranging from 0 to 5 volts. The pressure in the hydraulic system is displayed in convenient units such as pounds per square inch (PSI) or kilograms per square centimeter (KSC). The computer 62 converts from voltage to pressure using the setup parameter called pressure transducer voltage at 3000 PSI (211 KSC), parameter 110. The default value for this example is 5.01 volts. This default may be changed in increments of 0.01 from 4.0 to 6.0 volts.

Values received from the pressure transducer 64 are used to determine whether a minimum residual pressure is present, whether an actuator is being operated, whether a maximum operating pressure has been exceeded and others. A minimum residual pressure must be maintained in the hydraulic system or the leak detection system shuts it down. The minimum residual pressure parameter 112 is the minimum pressure that must be maintained in the hydraulic system for the system to continue to operate. In this example, the default value for this parameter is 50 PSI (3.52 KSC). This default may be changed in increments of 5 PSI (0.352 KSC) to a minimum of 5 (0.352) and a maximum of 250 PSI (17.58 KSC). A second minimum operating pressure is maintained if an actuator is operated. The minimum actuator operating pressure 114 is the parameter used as a reference for determining that an actuator is being operated. An actuator is being operated if this value is exceeded. The default value for this parameter is 250 PSI (17.58 KSC), with a minimum of 50 PSI (3.52 KSC) and a maximum of 1000 PSI (70.3 KSC) attained in increments of 10 (0.703).

In one situation, when the operating pressure is above the minimum actuator operating pressure 114 and the packer cylinders of the refuse truck are retracting, the flow going back to the hydraulic fluid reservoir 16 is greater than the output of the hydraulic pump 10. This condition presents a number of flow ratio's in the hydraulic system. The computer 62 automatically learns the proper operating flow ratios and stores them in memory.

The maximum operating pressure 116 is usually set at approximately 200 PSI (14.06 KSC) below the relief valve setting. If the maximum operating pressure 116 is reached the flow ratio's will be ignored. The default value for this parameter is 2200 PSI (154.68 KSC) and it may be changed in increments of 50 (3.52) from a minimum of 1500 (105.46) to a maximum of 2500 PSI (175.77 KSC), in this example.

The leak detection system will shut down the hydraulic system after a fault condition is violated if the violation is present for a predetermined time for all faults except the blown fuse fault 52. If the blown fuse fault 52 is violated the operator is notified but the system is not shut down. The delay time for fault conditions 118 is the delay time for all fault conditions but the low fluid level 50. The delay time for fault conditions 118 defaults to 3 seconds and can be changed in increments of 1 to a minimum of 1 and a maximum of 10 seconds. The low fluid level fault 50 has a different delay time called the low fluid level delay 120. The low fluid level delay 120 defaults to 3 seconds and may be changed to a minimum of 1 and a maximum of 10 seconds.

The final calibration setup parameters are flow ratio references used as limits for the ratio of the theoretical pump output flow divided by the actual fluid flow returning to the reservoir. One flow ratio is defined for each of the four fault windows 36, 38, 40, and 42. The flow ratio for window A 122 defaults to 0.93 and may be changed in increments of 0.01 to a minimum of 0.5 and a maximum of 1. It is used by window A 36 for detecting when no actuators are operating in the hydraulic system. The flow ratio for window B 124 defaults to 0.5 and may be changed in increments of 0.1 to a minimum of 0.2 and a maximum of 1. This reference is used by window B 38 for detecting when an actuator is operating in the hydraulic system. The flow ratio for window C 126 defaults to 0.2 and may be changed in increments of 0.1 to a maximum of 1. It is used by window C 40 as a limit when the packer is extending and is used only when the packer extend signal is present. The flow ratio for window D 128 defaults to 1 and may be changed in increments of 0.1 to a minimum of 0.5 and a maximum of 4. This flow ratio is used by window D 42 as a limit when the packer is retracting and is used only when the packer retract signal is present. Window faults A–D, 36, 38, 40 and 42 will be explained in detail below.

Figure 3:
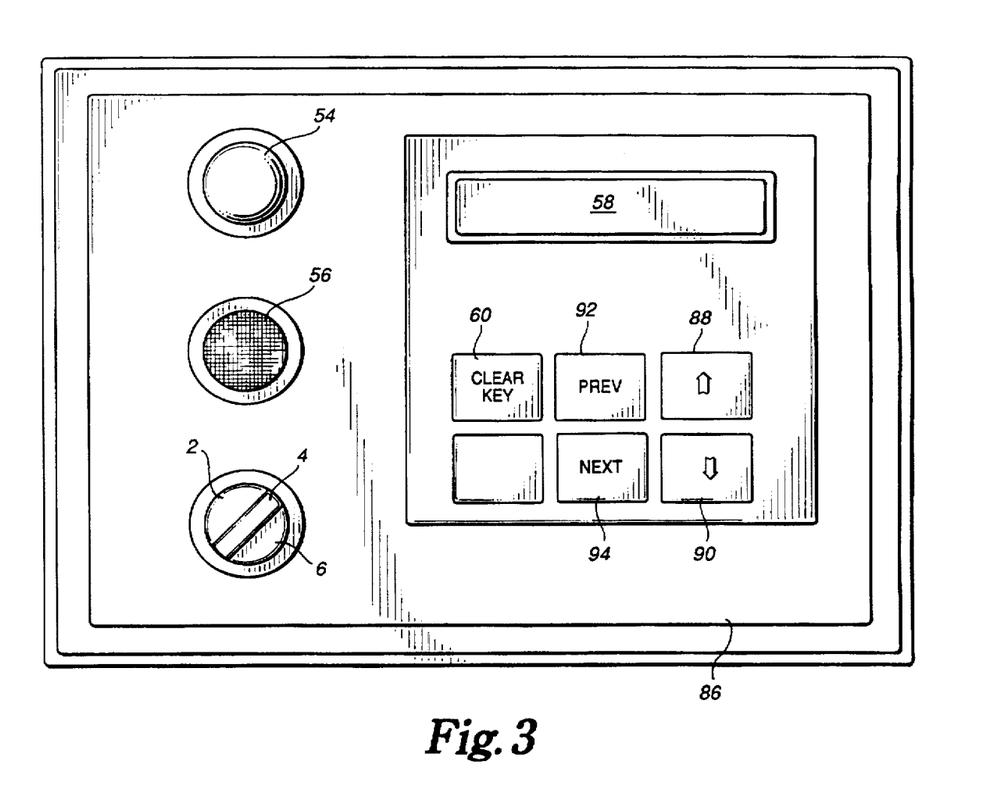
FIG. 3 shows a display console for the leak detection system.

The Calibrate/Clear/Maintenance Mode 2 is used to enter the setup parameters, including desired Maintenance parameters, and also to reset the leak detection system after a fault condition has been violated. To reset the system, the selector switch 6 is turned to the Calibrate/Clear/Maintenance Mode 2 and the clear leak button 60, shown in FIGS. 2 and 3, is pressed.

Maintenance parameters 101, diagrammed in FIG. 1, are entered with the selector switch 6 turned to the Calibrate/Clear/Maintenance Mode 2. The maintenance parameters 101 are time values representing the length of time between changes. Maintenance time periods are entered for the hydraulic fluid 103 and hydraulic fluid filters or strainers 105. In a truck mounted system maintenance parameters may be included for engine oil changes 107, air cleaner changes 109 and fuel filters 111. When the time period between changes has passed, the display 58, shown in FIG. 2, indicates the need for a change to the operator.

Figure 4:
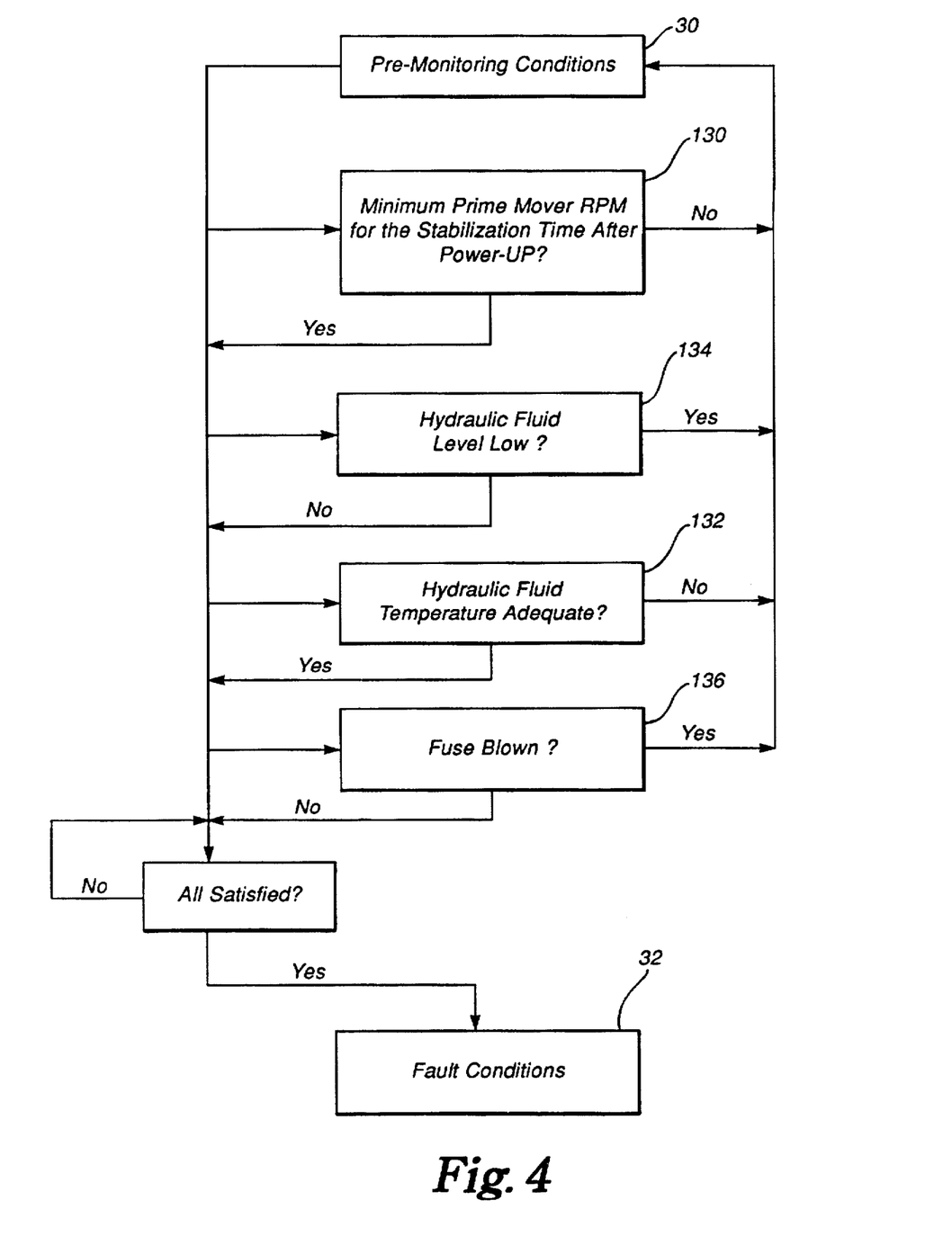
FIG. 4 is a flow chart of pre-monitoring conditions.

In the Operate Mode 4, the leak detection system checks the pre-monitoring conditions 30 before monitoring the hydraulic system for the fault conditions 32. As shown in FIG. 4, the prime mover speed must be above the minimum prime mover RPM value, parameter 100, for longer than the stabilization time after power up, parameter 102. This pre-monitoring condition is indicated by numeral 130. To meet a second condition, the temperature switch 76 in the hydraulic fluid reservoir 16 must send an electrical signal to the computer 62 to indicate that the hydraulic fluid temperature is above the predetermined value of approximately 65° F. or 18° C. This is indicated at numeral 132. A third condition is met if the hydraulic fluid float switch 74 is closed as indicated at 134 and a fourth condition is met if the power fuse is not blown, indicated at 136. The leak detection system begins monitoring the hydraulic system for violations of the fault conditions 32 only if all pre-monitoring conditions 30 are met.

The leak detection system monitors the hydraulic system using fault windows 36, 38, 40, and 42, and basic faults 44. Window A 36 is used when no actuators are operating in the hydraulic system. The computer 62 verifies that the hydraulic system's fluid pressure, as measured by the pressure transducer 64, is greater than the minimum residual pressure 112. If the fluid pressure drops below the minimum residual pressure 112 for at least the delay time for fault conditions 118, then a fault occurs. If the fluid pressure is greater than the minimum residual pressure 112, then the computer 62 checks the actual flow ratio to ensure that it is above the flow ratio for window A 122. The prime mover operating speed must be above the minimum prime mover RPM value at 100 for window A 36 to be checked.

Window B 38 is used when an actuator is operating and a packer is not retracting or extending. The state of the hydraulic system is such that the hydraulic fluid pressure is greater than the minimum actuator operating pressure 114. The prime mover's RPM value must be less than the hydraulic pump bypass RPM 106 and greater than the minimum prime mover RPM 100. If these conditions are met, the computer 62 compares the actual flow ratio for the hydraulic system to the flow ratio for window B 124. A violation occurs if the measured flow ratio falls below the predetermined parameter for longer than the delay time for fault conditions 118.

Window C 40 is used when the packer is extending and a violation is indicated if a flow ratio falls below the flow ratio for window C 126. Window C 126 is checked if a number of conditions are met. The hydraulic fluid pressure must be greater than the minimum actuator operating pressure 114. The prime mover RPM must be greater than the minimum prime mover RPM, parameter 100, and less than the hydraulic pump bypass RPM, parameter 106. In addition, the packer extend signal must be present at the packer extend input 78. If these conditions are met, the actual flow ratio is compared to the flow ratio for window C 126. A fault occurs if the actual flow ratio falls below the given parameter for longer than the delay time for fault conditions 118.

Window D 42 is used when the packer is retracting. Window D 42 is checked only if the packer retract signal is present. Also, the hydraulic fluid pressure must be greater than the minimum actuator operating pressure 114, but less than the maximum operating pressure 116. Also, the prime mover RPM must be greater than the minimum prime mover RPM, parameter 100, and less than the hydraulic pump bypass RPM 106. A fault occurs if the flow ratio falls below the flow ratio for window D 128 for longer than the predetermined time for fault conditions 118.

The basic faults 44 are conditions of interest for the proper operation of the hydraulic system. The low pressure 46 fault condition monitors the hydraulic fluid pressure to see if it falls below the minimum residual pressure 112 for the delay time for fault conditions 118. If the refuse truck's body is up, a body up proximity switch is active. In this state, the computer 62 does not look at any of the four fault windows. Instead, the computer 62 looks to see that the hydraulic fluid pressure is greater than the minimum residual pressure 112. If the residual pressure falls below the minimum residual pressure 112 for longer than the delay time for fault conditions 118, than the system is shut down. The low fluid level 50 fault condition is violated if the hydraulic fluid float switch 74 is open for longer than the low fluid level delay 120. The blown fuse 52 fault condition is violated if the fuse blown input 84 is not receiving a signal.

If a fault condition is violated, including satisfaction of the time periods, the leak detection system shuts down the hydraulic system, as described above. Shutting down the hydraulic system includes shutting off the flow of hydraulic fluid from the reservoir 16 to the hydraulic pump 10 and disengaging the hydraulic pump 10 from the prime mover 12. As shown in FIG. 2, the leak detection system includes an engaging/disengaging device 138. A response signal is sent from the computer 62 to the engaging/disengaging device 138 for disengaging the hydraulic pump 10 from the prime mover 12. This shuts off the hydraulic pump 10 and prevents the pump 10 from becoming damaged due to lack of fluid flow from he reservoir 16. The hydraulic fluid flow is shut off at the reservoir by turning a ball valve 142 to its closed position.

The ball valve 142 is in the inlet line 144 leading from the hydraulic fluid reservoir 16 to the hydraulic pump 10. The ball valve 142 is situated between an inlet strainer 146 and the hydraulic pump 10 in the inlet line 144. The ball valve 142 is a normally open (NO) ball valve operated pneumatically by an air-driven actuator 148. The air-driven actuator 148 is connected to two air lines, 150 and 152. The air lines, 150 and 152 are in turn connected to electrically operated pneumatic valves, 154 and 156. One pneumatic valve 154 is used for opening the ball valve 142 and the other pneumatic valve 156 is used for closing the ball valve. The pneumatic valves 154 and 156 are electrically operated and the computer 62 sends the appropriate response signals to the pneumatic valves, 154 and 156, for closing or opening the ball valve 142. An air supply line 158 from the refuse truck is connected to the pneumatic valves 154 and 156, for supplying air to the valves and the air-driven actuator 148. Activating either the open pneumatic valve 154 or the close pneumatic valve 156 connects the air supply line from the refuse truck with the air-driven actuator 148. This in turn closes or opens the ball valve 142 as desired.

The leak detection system is reset by turning the selector switch 6 to the Calibrate/Clear/Maintenance Mode 2 and pressing the clear leak button 60. This turns off the visual and audio indicators. The computer 62 also engages the engaging/disengaging device 138 and sends an electrical signal to the open pneumatic valve 154. This puts the air supply line 158 in communication with the air driven actuator 148 and opens the ball valve 142.

As shown in FIG. 3, a display console 86 is provided for mounting in the cab of the refuse truck. The display console 86 includes the selector switch 6, and audio and visual leak indicators, 54, 56, and 58. A key pad is provided for entering setup parameters and clearing the leak detection system after a fault condition has been violated. The selector switch 6 can be turned to the Operate Mode 4 or the Calibrate/Clear/Maintenance Mode 2. A leak detected buzzer 56 and a leak detected light 54 are provided on the display console 86 for communicating to the operator or individuals in the area that a fault condition has been violated.

Situated in the console 86 are a key pad and a multi-character display 58. These are provided for entering and changing setup parameters. The display 58 also displays information about the current operating characteristics and maintenance of the hydraulic system and, if a fault condition has been violated, it displays the violation. The key pad has a previous button 92 and a next button 94 for changing from one setup parameter to another. The up and down arrow buttons, 88 and 90, are for incrementing or decrementing a setup parameter as desired.

Figure 5:
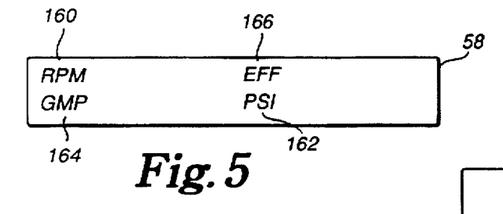
FIG. 5 shows a multi-character display of the leak detection system in normal operation.
Figure 6:
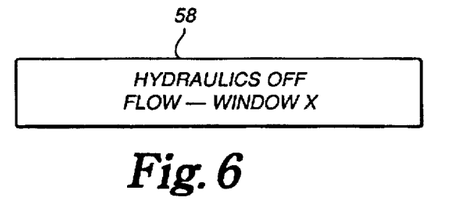
FIG. 6 shows an example of the multi-character display after a fault condition has been violated.

As shown in FIG. 5, the display 58 normally displays the prime mover speed 160, fluid pressure 162, fluid flow 164 and efficiency rating 166 for the hydraulic pump 10. The efficiency rating 166 is the ratio of the fluid flowing out of the pump 10 and the fluid flowing into the pump 10. If a fault condition is detected, the display 58 indicates that the hydraulics have been shut off and the reason for the shutdown. One example of this is shown in FIG. 6, where the display 58 shows the words "Hydraulics Off" on one line and "Flow-Window x" on another line. This displays the window and parameter that has been violated.

If a fault condition has been violated, the hydraulic system may be shut down and the indicator or display signals are sent to the display console 86 for communicating to the operator or individuals in the area that a fault has occurred. The leak detected light 54 is turned on and the leak detected buzzer 56 is also turned on at this time. The buzzer will buzz constantly for a predetermined time period and then intermittently. At the same time, the display 58 indicates that the hydraulics have been shut off and the reason for the shut down, if needed.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A monitoring, warning and safety system for a hydraulic system, comprising:
    (a) sensing means for measuring one or more predetermined parameters of said system and producing sensor signals indicative of measurements obtained for said one or more physical parameters;
    (b) monitoring means, connected with said sensing means, for receiving the sensor signals and determining whether an abnormal condition indicative of loss of hydraulic fluid is present in the hydraulic system based on the sensor signals and for producing responsive signals indicative of an abnormal condition;
    (c) reacting means, connected with said monitoring means, for reacting to an indication of abnormal condition related to hydraulic system fluid loss; and
    (d) wherein the hydraulic system comprises a closed system having a prime mover driving a hydraulic pump drawing fluid from a reservoir and a return line for returning said fluid to the reservoir, said sensing means comprising an RPM sensor in communication with the prime mover and a flow meter connected in the hydraulic system return line.

2. The system of claim 1, wherein said sensing means further comprises a pressure transducer.

3. The system of claim 2, wherein said sensing means further comprises a fluid level switch.

4. A monitoring, warning and safety system for a hydraulic system including a hydraulic pump and a reservoir, comprising:
    (a) sensing means for measuring one or more predetermined parameters of said system and producing sensor signals indicative of measurements obtained for said one or more physical parameters;
    (b) monitoring means, connected with said sensing means, for receiving the sensor signals and determining whether an abnormal condition is present and for producing responsive signals indicative of an abnormal condition;

(c) reacting means, connected with said monitoring means, for reacting to an indication of abnormal conditions; and (d) wherein said measuring means measures hydraulic fluid flow leaving the pump and hydraulic fluid flow returning to the reservoir and wherein said monitoring means determines a ratio of these values and compares the ratio to stored values.

5. A monitoring, warning and safety system for detecting leakage in a closed hydraulic system including a pump driven by a prime mover and having fluid from a reservoir and a return line for returning said fluid to the reservoir, said system comprising:

(a) sensing means for measuring one or more predetermined operating parameters in said system, the abnormality of which is indicative of a loss of hydraulic fluid from the said system and producing sensor signals indicative of the measurements obtained for said one or more physical parameters;

(b) monitoring means, connected to said sensing means, for receiving the sensor signals and determining whether an abnormal condition indicating loss of hydraulic fluid from said hydraulic system is present in the hydraulic system based on the sensor signals and producing responsive signals indicative of an abnormal condition;

(c) reacting means, connected with said monitoring means, for reacting to an indication of abnormal condition indicative of a loss of hydraulic fluid by interrupting the operation of the system, and (d) enabling means for enabling said monitoring means only upon initially verifying an absence of abnormal conditions.

6. The system of claim 5 wherein said reacting means comprises means for disengaging the pump from the prime mover.

7. The system of claim 5 wherein said reacting means further comprises mechanized valve means connected in the hydraulic system for interrupting and enabling hydraulic fluid flow in the hydraulic system.

8. The system of claim 6, wherein the hydraulic system comprises a reservoir for storing hydraulic fluid and said sensing means comprises a fluid level switch for sensing a level of fluid in the reservoir.

9. The system of claim 6 wherein said reacting means further comprises mechanized valve means connected in the hydraulic system for interrupting and enabling hydraulic fluid flow in the hydraulic system.

10. The system of claim 9 wherein said valve means comprises a valve in an inlet line leading from said reservoir to said pump.

11. The system of claim 5 further comprising alphanumeric display means for communicating the identity of an existing abnormal condition.

12. The system of claim 6 further comprising alphanumeric display means for communicating the identity of an existing abnormal condition.

13. A method for monitoring and disabling the operation of a closed hydraulic system, comprising the steps of:

(a) sensing and producing sensor signals indicative of certain parameters in the closed hydraulic system;

(b) determining the presence of an abnormal condition indicative of a loss of hydraulic fluid in the hydraulic system based on the sensor signals;

(c) producing response signals indicative of the presence of the abnormal condition indicative of a loss of hydraulic fluid in the hydraulic system; and (d) disabling operation of the system based on the existence of an abnormal condition indicative of a loss of hydraulic fluid.

14. The method of claim 13, further comprising the steps of:

(e) identifying the abnormal condition to the operator.

* * * * *